United States Patent Office.

CHARLES S. WESTLAND AND JOHN B. ALLEN, OF PROVIDENCE, RHODE ISLAND.

Letters Patent No. 82,187, dated September 15, 1868.

IMPROVED KITCHEN-IMPLEMENT.

The Schedule referred to in these Letters Patent and making part of the same.

TO ALL WHOM IT MAY CONCERN:

Be it known that we, CHARLES S. WESTLAND and JOHN B. ALLEN, of Providence, in the county of Providence, and State of Rhode Island, have invented a new and useful Improvement in Kitchen-Implements; and we do hereby declare that the following is a full, clear, and exact description thereof, which will enable others skilled in the art to make and use the same, reference being had to the accompanying drawings, forming a part of this specification, in which—

The drawing represents a perspective view of our invention.

Similar letters of reference indicate like parts.

The object of this invention is to provide an implement, available both as a stove-plate lifter and a holder for knives, forks, and spoons, which latter will, when so held by the implement, be conveniently accessible to the person employed in cooking, for while the point of the implement rests in the socket of any one of the stove-plates, the holder-devices on the shank will be convenient to place in or take from a spoon, knife, or fork, as may be required.

In the drawing—

A is the point which fits into the sockets of stove or range-plates, for the purpose of lifting them on or off the holes.

B is the handle of the implement.

The shank D is widened, as shown, and provided with curved and straight slots, a, suitable for inserting therein spoons, knives, or forks.

E is a chamber, cast in the shank, to catch the grease from the said spoon, knife, or fork, and prevent it from dripping upon the stove.

It is generally the case, that while superintending culinary operations the cook must hold and employ occasionally spoons, knives, or forks, which cause much inconvenience in mislaying the same, or retaining them in the hand. These inconveniences our invention will overcome in a great measure.

WESTLAND & ALLEN.
Lid Lifter.
No. 82,187.  Patented Sept. 15, 1868.
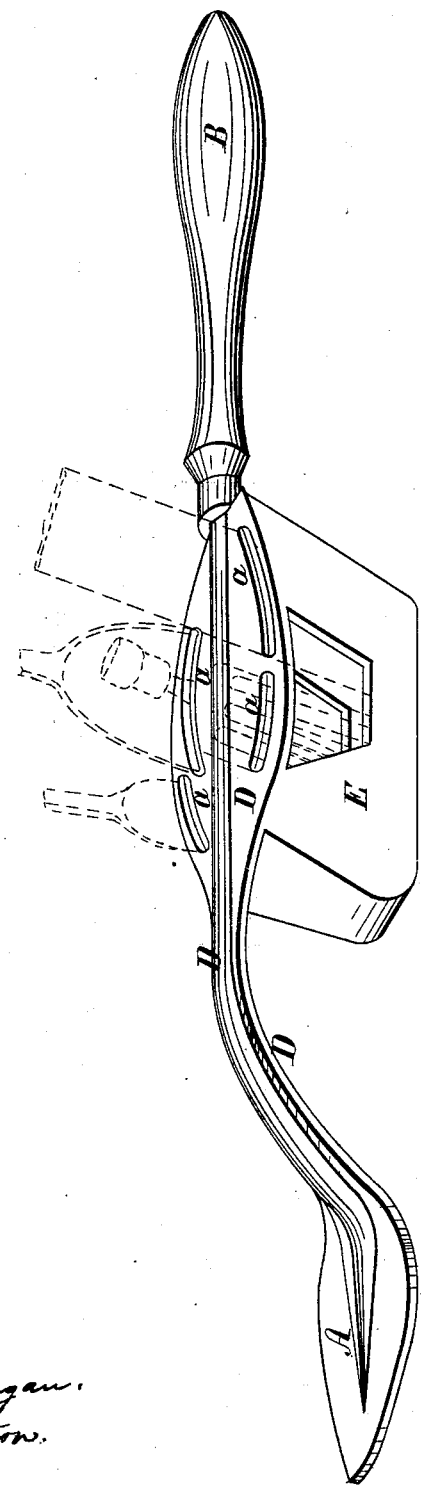

Having thus described our invention, we claim as new, and desire to secure by Letters Patent—

A kitchen-implement, constructed substantially as described, and for the purpose set forth.

CHARLES S. WESTLAND,
JOHN B. ALLEN.

Witnesses:
   E. H. BROWN,
   DANIEL J. CORDERY.